United States Patent [19]

Myren

[11] 3,860,792

[45] Jan. 14, 1975

[54] METHOD OF IDENTIFYING DIFFERENT DISTANCES BETWEEN MARKINGS ON A DATA RECORD AND A DEVICE FOR PERFORMING THE METHOD

[75] Inventor: Rune L. Myren, Spanga, Sweden

[73] Assignee: Svenska Dataregister AB, Solna, Sweden

[22] Filed: Jan. 22, 1973

[21] Appl. No.: 325,600

[30] Foreign Application Priority Data

Jan. 27, 1972 Sweden ................................ 917/72

[52] U.S. Cl. ....................... 235/61.6 R, 235/61.11 E

[51] Int. Cl. ............................................ G06k 7/10

[58] Field of Search. 235/61.11 E, 61.11 D, 61.6 R; 340/146.3 Z

[56] References Cited

UNITED STATES PATENTS

| | | | |
|---|---|---|---|
| 3,286,233 | 11/1966 | Lesueur | 340/146.3 Z |
| 3,610,891 | 10/1971 | Raciazek | 235/61.11 E |
| 3,744,026 | 7/1973 | Wolff | 235/61.11 E |

*Primary Examiner*—Daryl W. Cook
*Attorney, Agent, or Firm*—Norman Friedman; Robert F. Rotella; Stephen A. Roen

[57] ABSTRACT

An optically readable coded record consisting of markings comprising black bars on a white background having a predetermined spacing relationship for representing binary 1's and 0's is read by a counter which is clocked with a frequency $f$ during scanning of a black bar and a frequency $2f$ during scanning between bars. The system is not affected by variations in the width of the bars since the distance between center lines of adjacent markings is thereby calculated.

25 Claims, 3 Drawing Figures

METHOD OF IDENTIFYING DIFFERENT DISTANCES BETWEEN MARKINGS ON A DATA RECORD AND A DEVICE FOR PERFORMING THE METHOD

BACKGROUND OF THE INVENTION

The present invention relates to a method of identifying different distances between markings on a data record and a system for performing the method.

Markings on data records, such as optical readable codes, have been used for a long time within different technical fields in order to make it possible in a simple and economical manner for data processing equipment to receive information from a reading device connected to said data processing equipment.

In order to obtain essential advantages within each field of use or environment, new and distinct codes have been designed which show different characteristics.

Within the retail business, for instance, where automatic identification of goods has been used for some time, a lot of different codes have been tested which are optically or magnetically readable, which are intended to be read with constant or variable velocity, which — in the case where they are optically readable — consist of two or several colors, and which are built of concentric rings or bars recorded one after the other, etc.

An object of the present invention is to provide a simple and reliable method for identifying in a code on a data record, at least two different distances between markings, these markings being in the form of bars, circular rings or the like. The variation of the width of the markings or rings does not influence the correctness of the reading. The invention also pertains to a system for performing the method.

BRIEF DESCRIPTION OF THE DRAWINGS

A preferred embodiment of the invention will now be described with reference to the drawings in which.

DESCRIPTION OF AN ILLUSTRATIVE EMBODIMENT

Figure 1:
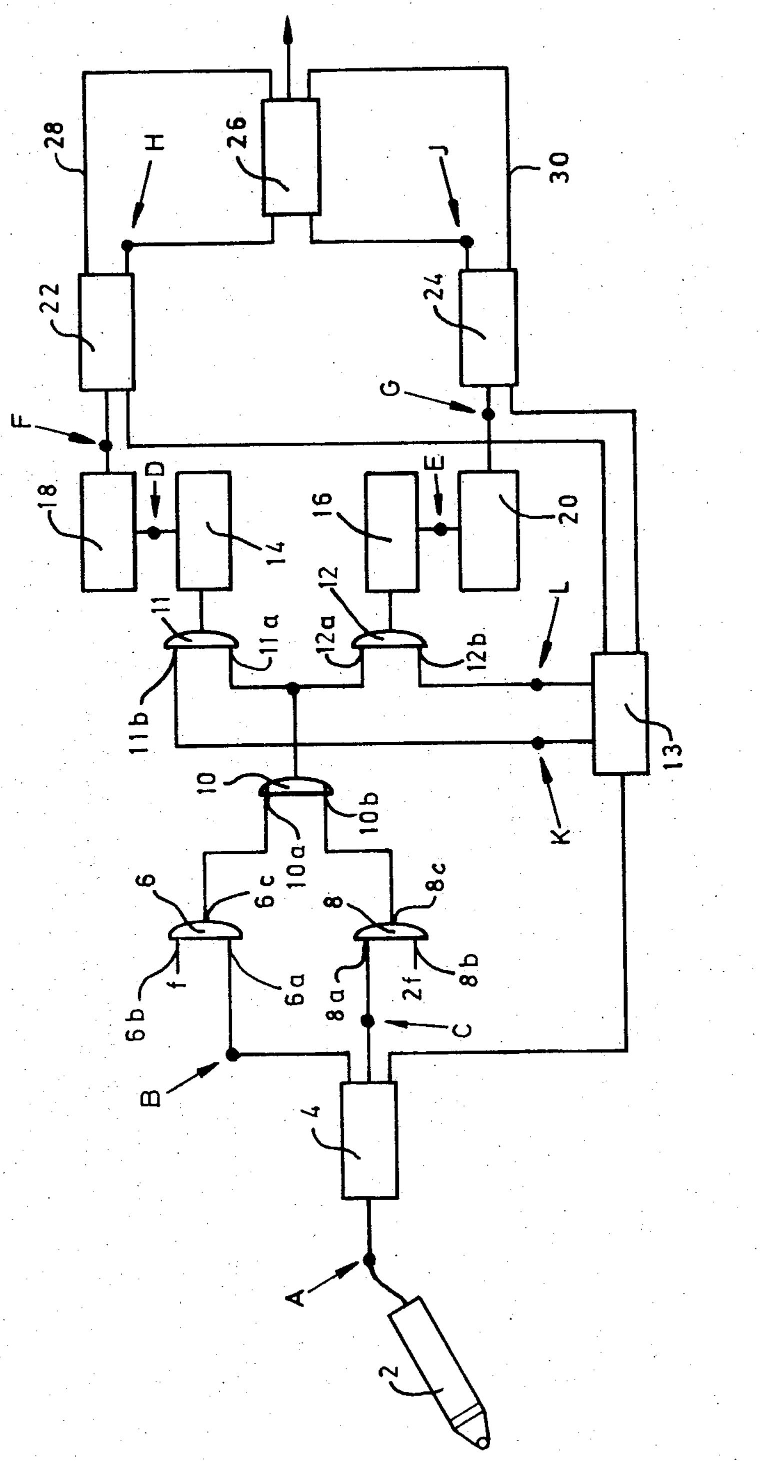
FIG. 1 schematically and in block form shows a distance identifying system in accordance with the present invention.

The code representation according to the present embodiment consists of black bars on a white background. There are two different distances — one short and one long, the latter being approximately twice as long as the short distance — between adjacent bars in the reading direction. The short distances, for instance, represent binary 0's and the long distances represent binary 1's. Four distances (short and/or longer) within each character would give 16 combination possibilities which means that any of the digits 0–9 can be represented.

The code according to the invention is intended to be read by an optical reader 2, which can be the optical reader described in U.S. Pat. No. 3,509,353, for instance.

A reflection detector consisting of black-white detector 4 is connected to the optical reader 2. One output of detector 4 is connected to one input terminal 6*a* of an AND gate 6 and another output of detector 4 is connected to one input terminal 8*a* of an AND gate 8. The other input terminal 6*b* of AND gate 6 is fed with the frequency *f* while the second input terminal 8*b* of AND gate 8 is fed with a frequency which is double the frequency *f*, i.e., 2*f*. The two output terminals 6*c* and 8*c* of AND gates 6 and 8 are connected to two input terminals 10*a* and 10*b* of an OR gate 10. The output of OR gate 10 is connected to two input terminals 11*a* and 12*a* of two AND gates 11 and 12. The other input terminals 11*b* and 12*b* of AND gates 11 and 12 are connected to a binary counter 13 the input of which is connected to black-white detector 4. The output of AND gate 11 is connected to a counter 14 and the output of AND gate 12 is connected to a counter 16.

Counters 14 and 16, which can consist of conventional binary counters, for instance, are each connected to conventional digital memories 18 and 20, respectively. The outputs of memories 18 and 20 are connected to arithmetic units 22 and 24, respectively, the outputs of which are connected to a comparator 26.

The function of the device according to FIG. 1 will now be described. The reader 2 is moved over the code representation in FIG. 2 from the left to the right with a constant velocity which is so selected such that hundreds of pulses can be counted by counters 14 and 16 for each bar and for each distance between bars in the code according to FIG. 2. However, it should be understood that it is unimportant how many pulses counters 14 and 16 are designed to count for each bar and for each distance. The only essential thing is that the relationship between the different distances between the bars can be detected which means that the velocity of the reader must not essentially be changed during the reading. This implies that equally wide bars and equal distances between bars must generate essentially the same number of pulses. A certain variation in velocity, however, is permitted and which will be hereinafter described. However, it will now be mentioned that the variation in the velocity, which normally appears when the pen-formed reader 2 manually is moved over the whole code representation, the total length of which usually is less than 3cm, is so small that it does not influence the correctness of the measured result with the selected tolerances for the distanes in the code.

Figure 2:
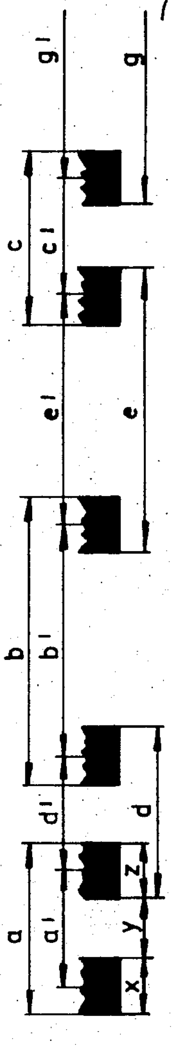
FIG. 2 shows a bar code on a data record of the type suitable to be read by the system shown in FIG. 1.
Figure 3:
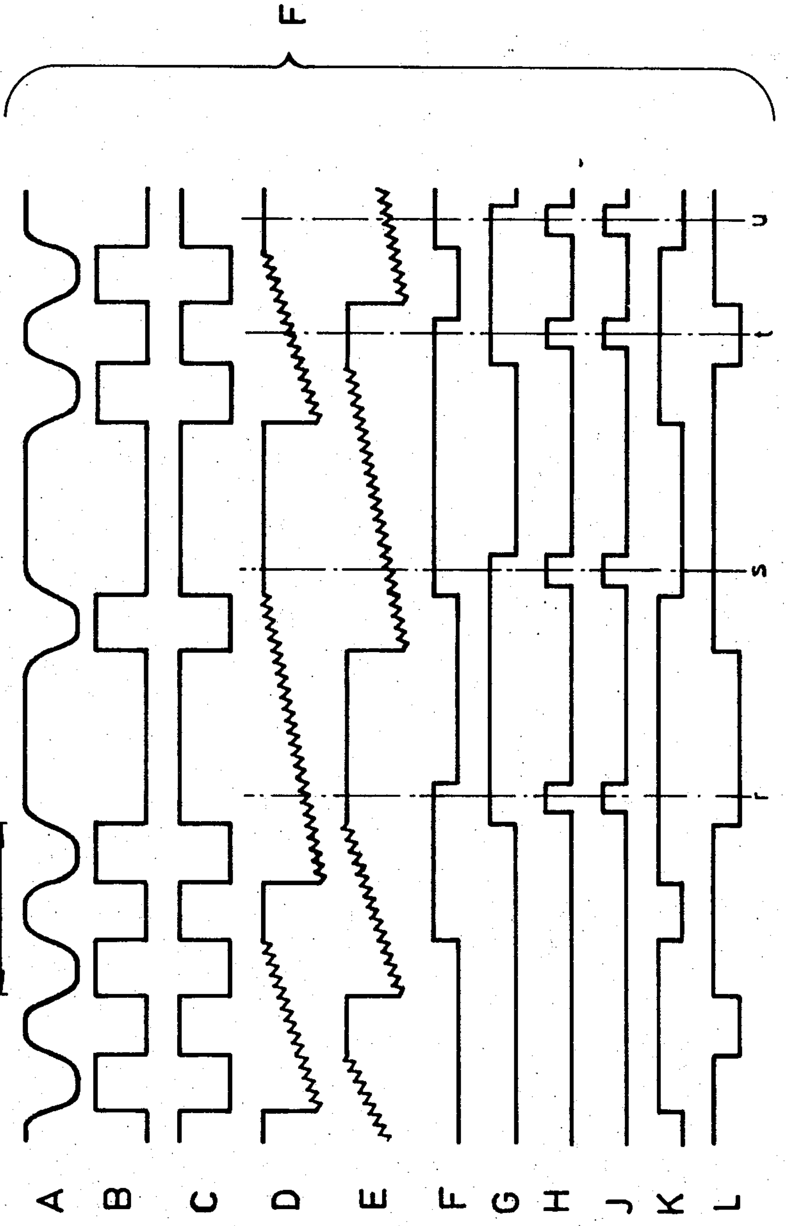
FIG. 3 shows wave forms obtained in different points in FIG. 1 which originate from the code in FIG. 2, the same reference symbols being used in FIGS. 1 and 3.

When, under the above-mentioned conditions, reader 2 is reading the code in FIG. 2, the wave form which is shown at A in FIG. 3, is obtained at point A in Fig. 1. At point B in FIG. 1, waveform B in FIG. 3 is obtained and is seen to comprise positive pulses corresponding to the black bars in FIG. 2 and which are fed to AND gate 6. At point C in FIG. 1 the waveform C in FIG. 3 is obtained and which comprises positive pulses corresponding to the distances between the black bars. These pulses are transmitted to AND gate 8.

The function of counter 14 is evident from waveform D in FIG. 3. Counter 14 counts during the time it takes the reader 2 to scan the first bar from the left, the distance between this bar and next bar and said next bar, i.e., the distance *a* in FIG. 2. Thereafter counter 14 counts during scanning of the distance between the leading edge of the next bar (the third bar from the left) and the trailing edge of the following bar. In FIG.

2, counter 14 thus counts the distances *a*, *b*, and *c*, whereby it counts with the frequency *f* when passing a black bar and with the frequency 2*f* when passing a white distance, depending on the fact that AND gates 6 and 8 in FIG. 1 are supplied with the frequencies *f* and 2*f*, respectively. During the scan of the distance *a* the counter 14 thus counts 100+2×100+100 = 400 pulses while during the distance *b* 100+2×300+100 = 800 pulss are counted, since the distance between the two black bars within the distance *b* is three times as long as the distance between the two black bars within the distance *a*. Counter 16 counts in a corresponding manner the distances *d*, *e*, and *g* in FIG. 2, i.e., it counts the distance between the leading edge of the last bar in distance *a*, which is measured by counter 14, and the trailing edge of the first bar in distance *b* which also is measured by counter 14, etc. As is evident from E in FIG. 3, 100+2×100+100 = 400 pulses are counted for the distance *d* in FIG. 2, while 100+2×300+100 = 800 pulses are counted by counter 16 for the distance *e*.

The reason why counter 14 is able to count distances which partly overlap the distances which are counted by counter 16 is that the signals (see waveforms B and C in FIG. 3) obtained from black-white detector 4 are also transmitted to binary counter 13 where they are transformed into the waveforms shown at K and L in FIG. 3. The waveforms shown at K thus consist of pulses which embrace distances *a*, *b*, *c*, etc. These pulses are transmitted to input terminal 11*b* of AND gate 11. The wave forms at L consist of pulses embracing the distances *d*, *e*, *g*, etc., in FIG. 2.

It has been described above that counter 14 counts during the time reader 2 is passing the distances *a*, *b*, *c*, etc., while counter 16 counts during the time the reader is passing the distances *d*, *e*, *g*, etc. However, these distances are not compared directly in order to detect whether a short or a long distance has been read. According to the invention, these distances are first transformed into distances *a*,', *b'*,*d'*, *e'*, *g'*, etc., in order that variations in the width of the bars shall not influence the correctness of the reading. This transformation is accomplished by the counters 14 and 16 counting with double the frequency 2*f* when reader 2 passes the white area, which has been described above. As should be evident from FIG. 2, distance *a*, for instance, comprises the sub distances *x*, *y*, and *z*, which are measured by counter 14. Thus distance *a'* is $(x/2)+y+(z/2)$ which means that if counter 14 counts with the frequency *f* for the distances *x* and *z* and with the frequency 2*f* for the distance *y*, it has measured the distance *a'*, which is the distance between the center line of the first bar and the center line of the second bar in the code representation shown in FIG. 2. This measuring method, of course, is used for all distances which are measured by counters 14 and 16. It should also be noted that the method to let counters 14 and 16 count with double the frequency 2*f* for the distances between the bars is one of several suitable methods to determine the distances between the center lines of the different bars. Within the scope of the invention there are also other methods which will not be described in detail herein. As an example of such another method, it should be noted that multiplication by factor 2 (or division by factor 0.5) does not need to be done by letting counters 14 and 16 count with the frequency 2*f* for the distances between the bars by means of the device 6, 8, 10. This can be done by means of a suitable arithmetic device, before the values emitted from counters 14 and 16, which represent the different distances, are compared by comparator 26. In such a case this arithmetic device, for instance, can be permitted to perform all counting operations needed and the number of counters can be reduced to one.

It is thus noted from the above description that the distances between the center lines of the bars can be determined by detecting the leading and trailing edges of the bars, i.e., the determination can be made without using peak detecting methods, which as was earlier noted have several disadvantadges. It should also be noted that it is of no significance whether the widths of the bars vary within reasonable limits and that a symmetric change of the width of one or more bars does not influence the distance between the center lines of the bars at all.

As is also evident from FIG. 2, each distance *a'*, *d'*, and *c'* is half each distance *b'* and *e'*. This means that the first mentioned distances represent a certain information while the last mentioned distances represent other information (binary 0's and binary 1's, respectively according to the present embodiment).

The function of memory 18 is shown at F in FIG. 3. As soon as distance a has been counted by counter 14, the number of pulses therein are stored in memory 18 as long as this is necessary, i.e., the pulses are stored until the adjacent distance measured by counter 16 has been determined and compared with the distance *a*, which occurs at a point in time *r*. The number of pulses corresponding to distance *b* in FIG. 2 are stored in memory 18 and is compared with a number of pulses corresponding to distance *d* at a point in time *s*. Memory 20 works in the same manner as memory 18 (see G in FIG. 3) with the distinction that the pulses stored therein come from counter 16 which measures the distances *d*, *e*, *g*, etc., in FIG. 2.

The function of the arithmetic units 22 and 24 will now be described with reference to FIGS. 1 and 2 and H and J in FIG. 3.

When reader 2 has read the information within the first distance, i.e., distance *a* in the code, and the corresponding number of pulses (400) have been stored in memory 18, the control circuits associated with counter 13 give an impulse to the arithmetic unit 22 to multiply the number of pulses in the memory by 1.5 resulting in that 400×1.5 = 600 pulses are emitted to comparator 26 at the point of time *r* (see H in FIG. 3).

The reason why the multiplication is by 1.5 is that in this way the influence of a number of sources of errors are eliminated. For instance, such sources of errors can be comprised of changes in bar widths and distances between bars produced by the device recording the code, tolerances in the components of the device according to FIG. 1, variations in the reading velocity, etc. As the device according to the embodiment described herein is intended to detect two different distances, one distance of which is twice as long as the other distance, maximum tolerances are obtained when multiplication is by 1.5, if it is assumed that the plus and minus tolerances are equal, i.e., a long as well as a short distance (*b'*, *e'* and *a'*, *d'*, *c'*, respectively) can vary by 50 percent without influencing the correctness of the reading.

When reader 2 has read the information within the second distance, i.e., distance *d*, and the corresponding number of pulses (400) have been stored in memory 20, the control circuits associated with counter 13 emit a pulse to arithmetic unit 24 to send these pulses to comparator 26 at the point of time *r* (see J in FIG. 3). Since the precondition has been made that if a preceding distance in the code representation, i.e., distance *a* in this case, multiplied by 1.5, is greater than the following (subsequent) distance, i.e., distance *d* in this case, the last mentioned distance will be regarded as a short distance. Comparator 26 thus emits a signal which in the present case indicates that 600>400, i.e., distance *d* is a short distance.

At the next comparison, which is made at the point of time *s*, the comparator will emit a signal which means that the distance *b* is a long distance. How this is done will now be described.

As soon as distance *d* has been measured and compared with distance *a* at the point of time *r*, the control circuits in counter 13 send a pulse to arithmetic unit 24 to multiply the number of pulses (400), representing distance *d*, by 1.5. Due to reasons which have been described above, the result, i.e., 600 pulses is transmitted to the comparator. At the point of time *s*, the pulses representing the distance *b*, the number of which is 100+2×300 +100 = 800, have been transmitted to comparator 26 via counter 14, memory 18 and arithmetic unit 22, which at this time does not receive any pulses from the control circuits of counter 13 to perform a multiplication. Comparator 26 emits a signal which indicates that distance *b* is a long distance because 600 (the distance *d* × 1.5)>800.

At the point of time *t*, distances *b* and *e* are compared. This comparison will give the result that distance *e* is a long distance. The distance *e*, however, is not a long distance in relation to the preceding distance, i.e., distance *b*, and the arithmetic unit 22 must thus be given a pulse to transform this distance to a short distance. This is accomplished by the fact that when comparator 26 at the preceding comparison (*s*) is indicating a long distance (in this case the distance *b*) a signal is also transmitted via connector 28 to arithmetic unit 22 to divide the number of pulses in memory 18 by a factor 2 when this memory is again read. Thus, when comparator 26 compares the number of pulses from arithmetic units 22 and 24 at the point of time *t*, the result will be that the number of pulses (800), see F in FIG. 3, in memory 18 multiplied by 1.5 and divided by 2 (=600) by arithmetic unit 22 is less than the number of pulses (800) in memory 24. Thus, the comparator 26 will emit a signal showing that distance *e* is a long distance.

At the point of time *u* distances *e* and *c* are compared. The result of this comparison is that the distance *c* is a short distance. Before this is done, however, arithmetic unit 24, after receiving a signal from the control circuits of counter 13, will multiply the pulses in memory 20 by 1.5 and, after receiving a signal from comparator 26, via connector 30, will divide this distance by 2, since the preceding distance, i.e., distance *e*, was a long distance. Thereafter the last mentioned number of pulses 800×1.5/2 = 600 is compared with the number of pulses in memory 22, which is 400. Since 600>400 comparator 26 emits a signal representing a short distance, i.e., distance *c*.

Above there has been described the detection of all possible combinations of the distances used in the present embodiment i.e., a short distance precedes a short distance, a long distance precedes a short distance, a short distance precedes a long distance, and a long distance precedes a long distance. Of course, within the scope of the invention more than two distances can be detected. Also, if two distances are to be detected, for instance, two counters, two memories, two arithmetic units, etc., do not need to be used, as only one counter can be designed to measure all distances. In such a case a suitable arithmetic device performs all the mathematic calculations, such as multiplication of the distances between the bars by the factor 2 and multiplication of the distances between the center lines of the bars by the factor 1.5 Also the number of memories and their construction can be varied, depending on which counters and/or arithmetic devices are used.

The embodiment described herein thus comprises a code where two distances, one of which is twice as long as the other, are detected. The code is a binary self-clocking code and each character comprises five bars being essentially of the same width, three short distances *a'*, *d'*, *c'*, which suitably are twice as long as the width of the bars, and two long distances *b'*, *e'*, approximately twice as long as the short distances. Different locations of the bars and different distances form different characters. One of the bars in each character is used for parity checking while the remaining bars represent the numerical character. Of course, more bars and distances between bars can be used if alphanumerical representation is to be used. Instead of bars, other markings can be used for representing the coded information. For instance, such markings can be concentric rings, spots recorded one after the other, etc.

At the beginning of the code representation (to the left of the distance *a* in FIG. 2), irrespective of the information contents, there can be a code (not shown) which is so designed that it gives an impulse to the device in FIG. 1 to read the information as it is represented in the code if the code is read from the left to the right in FIG. 1. At the end of the code representation (to the right of distance *g* in FIG. 2) there can be a code which is so designed that it gives an impulse to the device in FIG. 1 to reverse the information which this device receives if the code is read from the right to the left in FIG. 1.

These two end codes differ from each character in the code according to FIG. 2 and function as start and stop codes. Both end codes must be read in order that the device according to FIG. 1 shall emit a signal to the associated data processing device. On each side of the whole code representation, including start and stop codes, there can be white fields (not shown) the length of which in the reading direction being approximately four times as long as a short distance (*a,40* ,*d'*, *c'*,) in the code. These fields ascertain that the device according to FIG. 1 is zeroed before the start code is read.

Above there has been described an embodiment of the present invention. It should be noted however that several different embodiments are possible without departing from the concept of the invention. Thus, the invention is not limited to this embodiment but is only limited to that which is stated in the claims.

I claim:

1. Method for identifying different distances between markings on a data record which are read by a reading device movable relative to said data record, which comprises:

sensing the leading and trailing edges of each of two adjacent markings;

calculating the distance between the leading and trailing edges of each of said markings;
calculating the distance between the trailing edge of a first-sensed marking and the leading edge of a second-sensed marking;
multiplying said first-calculated distances by a predetermined factor and adding thereto said last-calculated distance; whereby
the distance between the center lines of said two adjacent markings is determined.

2. Method as set forth in claim 1, wherein said predetermined factor is 0.5.

3. Method as set forth in claim 2, further comprising the step of:
comparing said center line distance with the distance betwen the center lines of the last markings and the next-adjacent marking scanned.

4. Method for identifying different distances between markings on a data record which are read by a reading device movable relative to said data record, which comprises:
sensing the leading and trailing edges of each of two adjacent markings;
calculating the distance between the leading and trailing edges of each of said markings by counting the time interval therebetween as said reading device is moved;
calculating the distance between the trailing edge of a first-sensed marking and the leading edge of a second-sensed marking by counting the time interval therebetween as said reading device is moved;
said first-calculated distance being counted at a first predetermined frequency; and
said second-calculated distance being counted at a second predetermined frequency; whereby
the distance between the center lines of said two adjacent markings is determined.

5. Method as set forth in claim 4, wherein:
said second predetermined frequency is double said first predetermined frequency.

6. Method as set forth in claim 5, further comprising the step of:
comparing said center line distance with the distance between the center lines of the last marking and the next-adjacent marking scanned.

7. Device for identifying different distances between markings on a data record which are read by a reading device movable relative to said data record, comprising:
means for sensing the leading and trailing edges of each of two adjacent markings;
means for calculating the distance between the leading and trailing edges of each of said markings;
means for calculating the distance between the trailing edge of a first-sensed marking and the leading edge of a second-sensed marking;
said first-calculated distances being multiplied by a predetermined factor and said last-calculated distance being added thereto; whereby
the distance between the center lines of said two adjacent markings is determined.

8. Device as set forth in claim 7, wherein said predetermined factor is 0.5.

9. Device as set forth in claim 8, further comprising:
means for comparing said center line distance with the distance between the center lines of the last marking and the next-adjacent marking scanned.

10. Device for identifying different distances between markings on a data record which are read by a reading device movable relative to said data record, comprising:
means for sensing the leading and trailing edges of each of two adjacent markings;
means for calculating the distance between the leading and trailing edges of each of said markings by counting the time interval therebetween as said reading device is moved;
means for calculating the distance between the trailing edge of a first-sensed marking and the leading edge of a second-sensed marking by counting the time interval therebetween as said reading device is moved;
said first-calculated distance being counted at a first predetermined frequency; and
said second-calculated distance being counted at a second pretermined frequency; whereby
the distance between the center lines of said two adjacent markings is determined.

11. Device as set forth in claim 10, wherein:
said second predetermined frequency is double said first predetermined frequency.

12. Device as set forth in claim 11, further comprising:
means for comparing said center line distance with the distance between the center lines of the last marking and the next-adjacent marking scanned.

13. Device as set forth in claim 12, wherein:
counter means are coupled to said reading device for calculating said first-calculated distance and said second-calculated distance.

14. Device as set forth in claim 13, wherein:
said reading device comprises an optical reader.

15. Device as set forth in claim 14, wherein:
the output of said optical reader is connected to reflection detector means responsive to said markings and to the spaces between said markings.

16. Device as set forth in claim 15, wherein:
said counter means comprises first and second counters, the first of which being arranged to receive signals representing a first distance between a leading edge of a marking and the trailing edge of the following marking and the second of which being arranged to receive signals representing a second distance between the leading edge of said following marking and a trailing edge of a marking following upon said last mentioned marking.

17. Device as set forth in claim 16, wherein:
said markings consist of bars on a data record having a reflectivity differing from said markings;
said reflection detector means being connected to binary counter means for transforming the signals emitted from the reflection detector into signals representing the first and second distances.

18. Device as set forth in claim 17, further comprising:
memory means connected to each of said counters the contents in said memory means being compared at predetermined points of time by a comparing means, whereby if the contents of the memories are essentially the same the comparing means emits a signal representing two equal distances following upon each other, or if the contents of the memories are essentially not equal the comparing means emits a signal representing different distances following upon each other.

19. Device as set forth in claim 18, further comprising:

at least one arithmetic unit being arranged to selectively multiply the contents of one of said memory means by a factor greater than 1 but less than 2 at predetermined points of time.

20. Device as set forth in claim 19, wherein:

said binary counter means controls said arithmetic unit to multiply the contents of one of said memory means only if said contents represent the first distance of two adjacent distances which are compared by said comparing means.

21. Device as set forth in claim 20, wherein:

said comparing device is provided with a feedback to said arithmetic unit and said comparing means emits an impulse to said unit, when it has received a number of pulses representing a long distance, to divide the number of pulses next coming to said arithmetic unit by 2.

22. Device as set forth in claim 10, wherein:

the markings on the data record and the distances therebetween constitutes a binary code wherein each character is represented by five markings having essentially the same width, three short distances and two long distances, said short distances being approximately half as long as the long distance.

23. Device as set forth in claim 22, wherein:

said short distances are essentially twice as long as the width of the markings.

24. Device as set forth in claim 23, wherein:

in connection with the first and the last character in the code on said data record there is a code functioning as a start-stop code indicating the direction in which the reading device is moved over said data record, said code being designed in the same manner as the code representing one character.

25. Device as set forth in claim 23, wherein:

in connection with the start-stop codes, respectively, on each side of the data record, there are fields with the same color as that of the data record and having a length in the reading direction which is greater than the long distance (*b*, *e*).

* * * * *